United States Patent [19]

Mogi et al.

[11] Patent Number: 4,975,134
[45] Date of Patent: Dec. 4, 1990

[54] METHOD FOR SUPPLYING TIRE CONSTITUENT MATERIAL

[75] Inventors: Kazuo Mogi; Heikichi Nakanome, both of Hiratsuka; Tstsuya Ohnishi, Fujisawa, all of Japan

[73] Assignee: The Yokohama Rubber Co., Tokyo, Japan

[21] Appl. No.: 274,749

[22] Filed: Nov. 21, 1988

Related U.S. Application Data

[63] Continuation of Ser. No. 873,022, Jun. 11, 1986, abandoned.

[30] Foreign Application Priority Data

Jun. 14, 1985 [JP] Japan ................. 60-128088

[51] Int. Cl.$^5$ ................. B29D 30/16; B29D 30/30
[52] U.S. Cl. ................. 156/133; 156/123; 156/405.1
[58] Field of Search ................. 156/123, 128.1, 130, 156/133, 134, 405.1, 406.4; 226/93, 162, 167

[56] References Cited

U.S. PATENT DOCUMENTS 4,240,863 12/1980 Vinton ................. 156/130 X
4,448,627 5/1984 Jatoh et al. ................. 156/405.1
4,526,647 7/1985 Portalupi et al. ................. 156/405.1 X

FOREIGN PATENT DOCUMENTS 1957 2/1966 Japan .
0105336 6/1982 Japan .
0059432 4/1984 Japan .

Primary Examiner—John J. Gallagher
Assistant Examiner—Geoffrey L. Knable
Attorney, Agent, or Firm—Armstrong, Nikaido, Marmelstein, Kubovcik & Murray

[57] ABSTRACT

A guide mechanism consisting of guide plates and guide rods and a reciprocating mechanism consisting of a fluid cylinder are disposed on a machine frame capable of coming close to and away from a building drum through a fluid cylinder and disposed in such a manner as to keep a slight gap between a support surface of a material and a drum surface when it comes close to the building drum. A moving member capable of reciprocation toward and away from the building drum is disposed in the reciprocating mechanism. A material support plate extending toward the building drum and a support member consisting of leaf springs urging and separating the material between them and the material support plate through a material push mechanism are disposed on the moving member. A cutting guide member is disposed at the tip of the machine frame in a fashion such that its tip projects from the tip of the material support plate when the material support plate moves back. When the material support plate moves back, the tire constituent material can be cut along the tip of the cutting guide plate, and when the material support plate moves forward on the drum, the tip of the tire consituent material projects by a distance l from the tip of the material support plate, and the material can be pressed to tack to the drum by manually pushing the projecting portion of the surface of the drum.

1 Claim, 4 Drawing Sheets

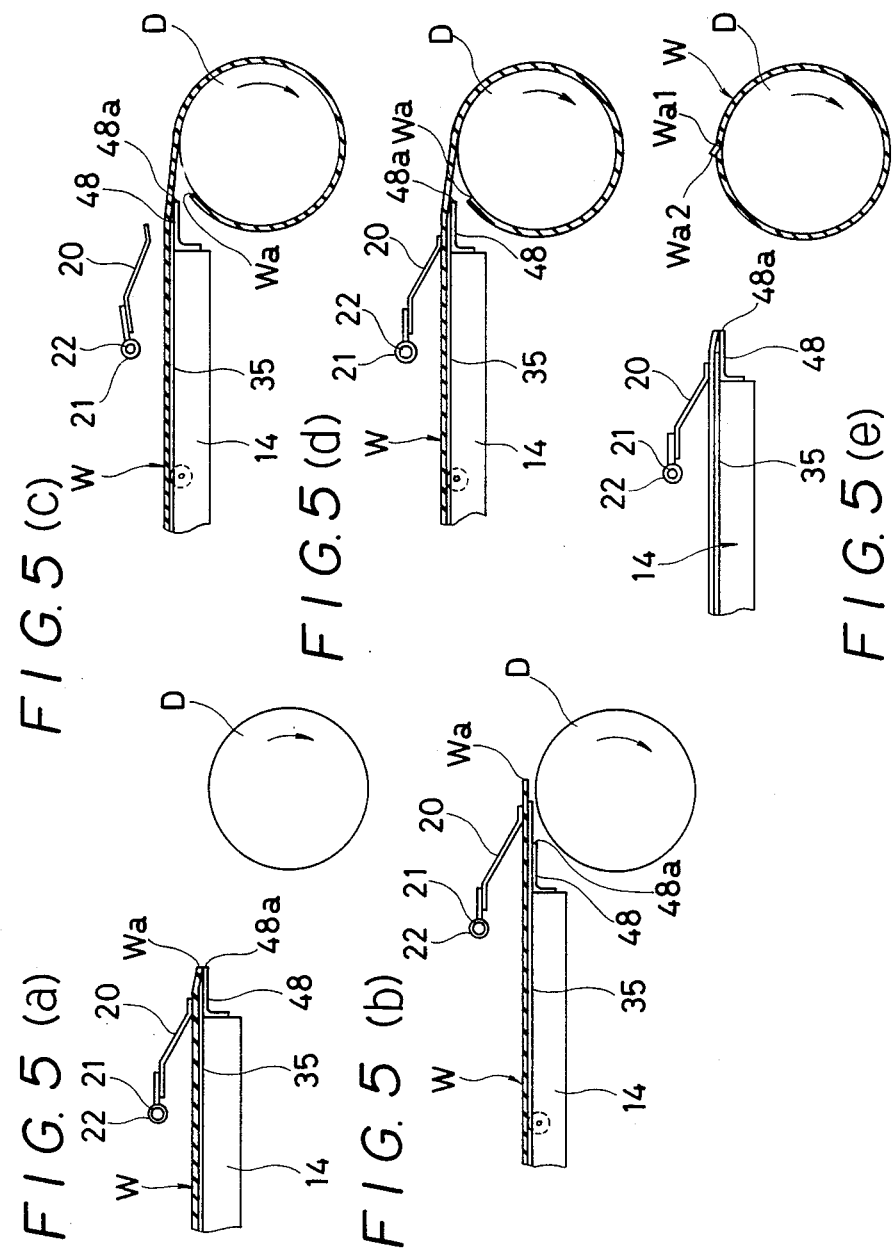

METHOD FOR SUPPLYING TIRE CONSTITUENT MATERIAL

This application is a continuation of application Ser. No. 873,022 filed June 11, 1986, now abandoned.

BACKGROUND

In the art of building green tires, the present invention relates to a method and apparatus for supplying tire constituent material in the form of a belt in or by which it is possible to take-up on a building drum and splice tire constituent material efficiently and accurately without a reliance on the skill of operators or workers.

When winding and splicing tire constituent materials on a building drum, conventionally it has been practiced to take out materials from a servicer rack, locate tips of the taken-out materials to a predetermined position on the building drum, press the materials to tack on the building drum, turn the building drum a full turn so as to wind the materials thereon, cut the tips of the materials by a knife or a pair of scissors in a manner such that they are in agreement with the ends of the materials after cutting, press-splice one of the end portions of the material to the tips of the materials which are wound on the building drum, and fold back the other end portions of the material to the service rack.

Therefore, the work of rapidly and accurately locating tips of taken-out materials to the predetermined position on the building drum depends greatly upon the skill of the worker, and the speed of the work as well as the accuracy in locating depend greatly upon the worker's skill.

Also, with the material cutting work, it is extremely difficult to determine the position for cutting so that the overlap quantity of the material joint portion becomes appropriate. Therefore, the work speed varies greatly, and variations occur in the cutting length of the materials. When, for example, the cut length is short, the portion near the joint portion is locally extended and spliced, while the overlap quantity of the joint portion will become excessive if the cut length is excessively great. Thus, non-uniformity occurs in the resulting tire.

Further, it is also difficult to accurately linearly cut wide materials such as an innerliner throughout its width, and non-uniformity is likely to occur at the joint portion.

For above described reasons, the accuracy at which tire constituent materials are wound up on the tire building drum and spliced has to depend on the skill of the worker, and the work speed varies from a worker to another, so that an improvement in or relating to the quality and the production efficiency of tires can hardly be attained.

In order to solve the problems, various apparatus have heretofore been proposed which automatically supply tire constituent materials to the building drum. However, all of the proposed apparatus are great in scale or size since they include an automatic cutter, a device for press-splicing the materials to the building drum, and so forth. Therefore, they involve a great space requirement, cannot be assembled in a multiple-stage arrangment and are extremely expensive to build.

On the other hand, the splicing accuracy is not sufficiently high at present for those constituent materials such as a carcass which requires a high splicing accuracy and for those relatively thick constituent materials equipped with a profile such as a side wall, a rim cushion, and so forth, because the work accuracy of the materials is not high or because the materials undergo deformation such as elongation. Accordingly, the work must be carried out manually at present, and an automation to completely eliminate the manual operation cannot be accomplished, whereby it is difficult to attain a desirable effect of investment.

SUMMARY

In order to eliminate the above indicated problems with the prior art, a first object of the present invention is to provide a method and apparatus for supplying tire constituent materials which can efficiently supply, wind, cut and splice tire constituent materials to and on a building drum.

A second object of the invention is to provide a method and apparatus for supplying tire constituent materials which can be easily practised by ordinary workers without a reliance on a particular skill of workers.

A third object of the invention is to provide an economic method and apparatus for supplying tire constituent materials which can improve both of the quality of tires and the efficiency of the production thereof.

A fourth object of the invention is to provide a method and apparatus for supplying tire constituent materials in which devices used are compact in scale such that they can be assembled in mutiple stages without any limitation applied to the installation space and can therefore be applied to conventional servicers with limited modifications.

THE DRAWINGS

FIGS. 5(a) to 5(e) are views, taken for illustration of the operation sequences.

THE PREFERRED EMBODIMENTS

Hereinafter, preferred embodiments of the present invention will be described with reference to the accompanying drawings.

Figure 1:
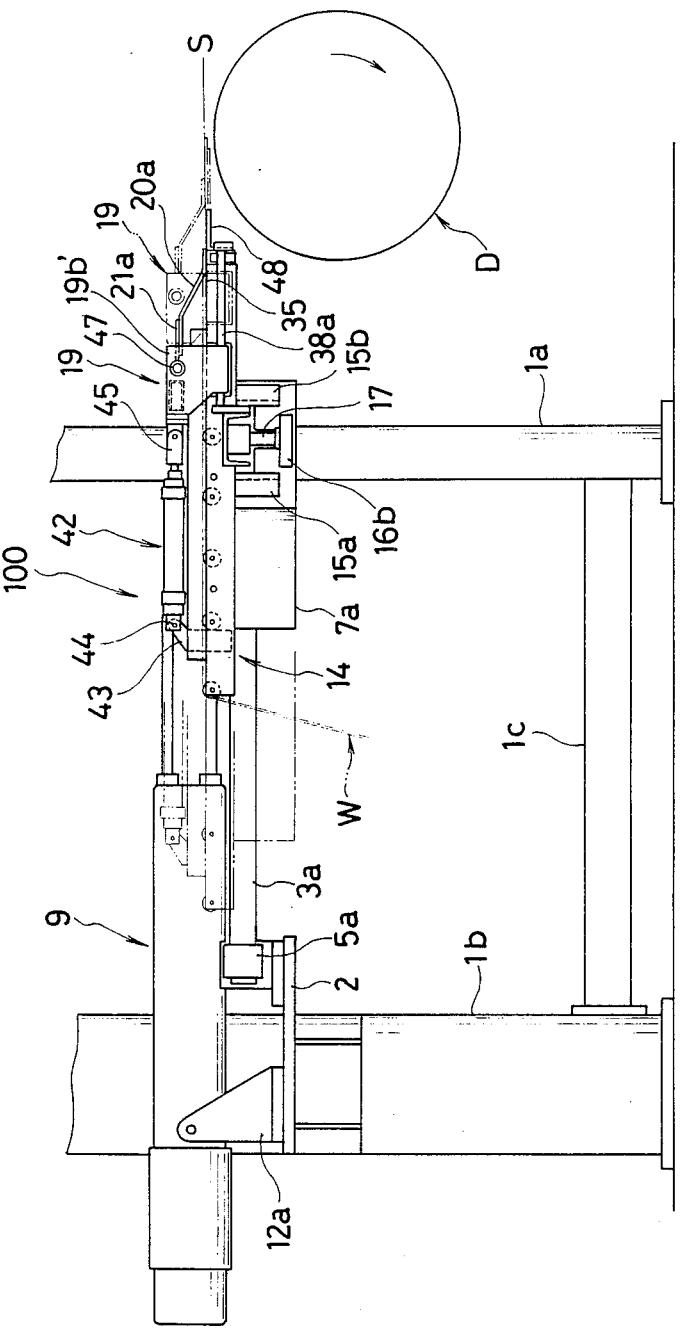
FIG. 1 is a side veiw, showing a whole of apparatus according to an embodiment of the present invention.
Figure 2:
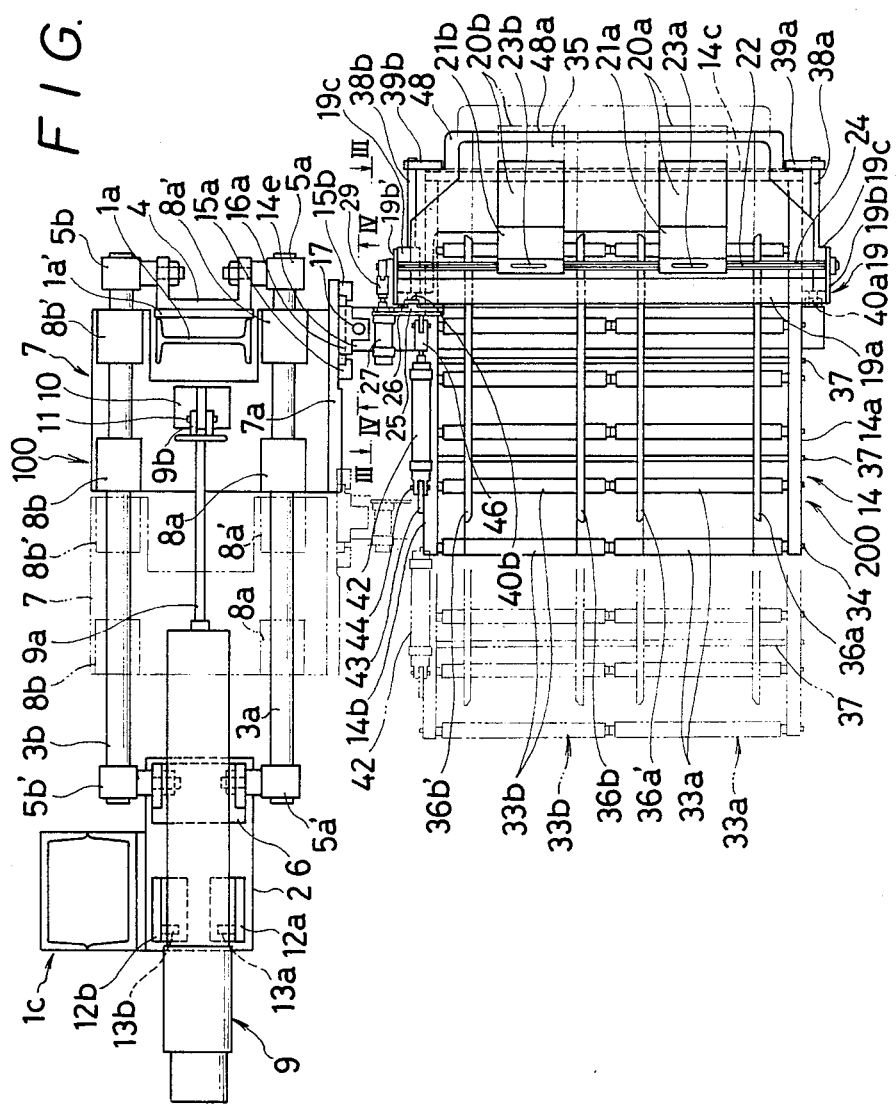
FIG. 2 is an overall plan view of the apparatus.

FIG. 1 shows an overall side view of a moving apparatus 100 to which the present invention is applied, and FIG. 2 shows an overall plan view of a supply apparatus 200 for tire constituent materials W. Reference numerals 1a, 1b and 1c of the moving apparatus 100 represent frames which constitute the apparatus. A support bed 2 is mounted to the frame 1b. Reference numerals 3a and 3b represent guide rods disposed on the support bed 2. Respective one ends of rods 3a and 3b are held by blocks 5a and 5b fixed to a bracket 4 which is in turn fitted to a fitting seat surface 1a' of the frame 1a and its other end is fixed to a bracket 6 mounted on the support bed 2.

A slide block 7 is slidably fitted to the guide rods 3a and 3b through a bearing (not shown). Journal boxes 8a, 8a', 8b and 8b' are fixed to this slide block 7. A motor cylinder 9 is fixed at its rear end part to brackets 12a and 12b fixed to the support bed 2, via pins 13a and 13b. A bracket 10 fixed to the slide block 7 is fitted via a pin 11 to a tip metal 9b of a rod 9a of the motor cylinder 9.

When the motor cylinder 9 is actuated to move the rod 9a backward, the moving apparatus 100 having the above described structure moves back to a position shown by two-dot-chain lines while being guided by the guide rods 3a and 3b. When the rod 9a of the motor cylinder 9 is moved forward, on the contrary, the slide block 7 is moved forwardly to a position shown by the solid lines while being guided by the guide rods 3a and 3b.

Figure 4:
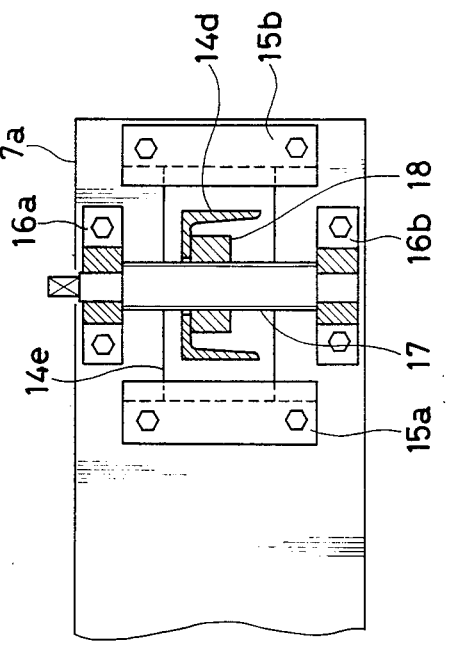
FIG. 4 is a sectional view taken along line IV—IV in FIG. 2.

Next, the skeletal structure of a machine frame 14, which constitutes the supply apparatus 200, is produced by mutually welding steel pipes 14a, 14b and 14c and a groove-shaped steel 14d as shown in FIG. 4. Guide plates 15a and 15b are fitted to a flange 7a of the slide block 7 in such a fashion as to interpose therebetween a plate 14e which is fixed to the tip portion of the groove-shaped steel 14d. A screw rod 17, which is rotatably fitted by bearings 16a and 16b fitted to the flange 7a, meshes with a nut 18 which is fixed to the groove-shaped steel 14d of the machine frame 14 (FIG. 4). Due to the construction described above, the machine frame 14 can be moved up and down by turning normally or reversely the screw rod 17 through the nut 18.

A moving member 19 is disposed on the machine frame 14 and its skeletal structure consists of a square steel pipe 19a, side plates 19b and 19b' fixed at both ends of the square steel pipe 19a and journal boxes 19c and 19c' fixed to the side plates 19b and 19b', respectively.

Figure 3:
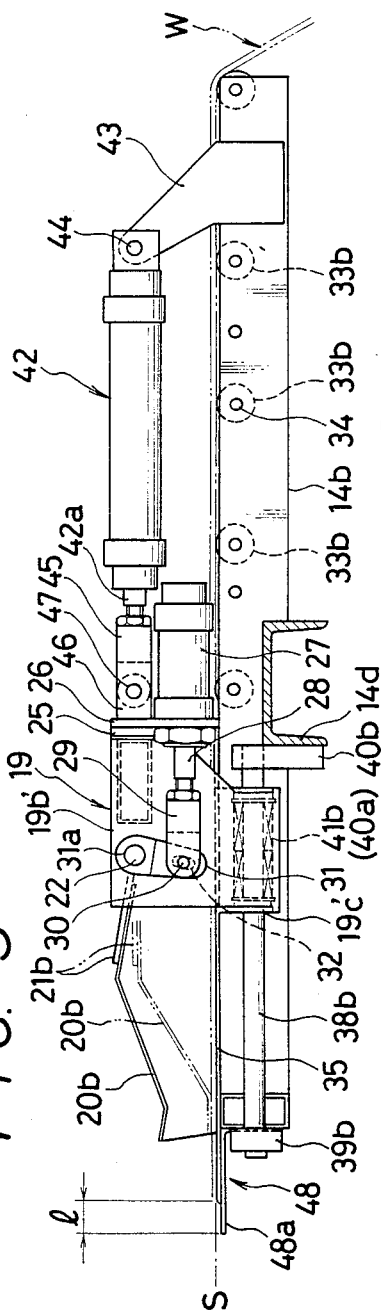
FIG. 3 is a view taken along line III—III in FIG. 2.

Reference numerals 20a and 20b represent support members which consist of so-called leaf springs. Springs 20a and 20b are fixed to holders 21a and 21b, which are mounted to a rod 22 held rotatably on the side plates 19b and 19b' of the moving member 19 by fitting keys 23a and 23b fixed to the holders 21a and 21b to a key groove 24 disposed on the rod 22. A seal plate 25 is fixed to the square steel pipe 19a of the moving member 19 and a plate 26 is fixed to this seat plate 25. A fluid cylinder 27 constituting a material support mechanism is fitted to this plate 26. A connector 29, which is fixed to the tip of a a cylinder rod 28 of the fluid cylinder 27, is fitted in engagement with an elongated hole 32 of an arm 31 through a pin 30, as shown in FIG. 3. A boss 31a of the arm 31 is fixed to the rod 22.

The supply apparatus 200 is constituted as described above. When the rod 28 of the fluid cylinder 27 moves forwardly, the rod 22 rotates through the connector 29, the pin 30 and the arm 31 and the leaf springs 20a and 20b rotate and move toward up through the keys 23a and 23b, the key groove 24 and the holders 21a and 21b. When the rod 28 of the cylinder 27 moves backward, on the contrary, the rod 22 rotates through the connector 29, the pin 30 and the arm 31 and the leaf springs 20a and 20b rotate and move downwardly to a position shown by one-dot-chain lines through the keys 23a and 23b, the key groove 24 and the holders 21a and 21b (FIG. 3). Since the holders 21a and 21b are slidable on the rod 22, their positions can be easily adjusted in match with the position of the material.

In FIG. 2, reference numerals 33a and 33b denote a plurality of free rollers, which are fitted to the square steel pipes 14a and 14b of the machine frame 14 through a shaft 34. The material support plate 35 is fitted to the upper surface of the journal boxes 19c and 19c' of the moving member 19, and the free rollers 33a and 33b and the material support plate 35 together constitute a material support surface S.

The gap between the material support plate surface S and the surface of the drum D can be adjusted suitably by rotating either normally or reversely the screw rod 17 so as to move up and down the machine frame 14 through the nut 18.

Next, the guide plates 36a, 36a', 36b and 36b' for the tire constituent materials W are slidably fitted to the guide rods 37 and 37' which are fixed to the square steel pipes 14a and 14b of the machine frame 14 as shown in FIG. 2, and are adjustable relative to the width of the machine frame 14 and the desired tire constituent materials W to center the tire constituent materials W relative to the machine frame 14 and drum D. As described previously the leaf spring holders 21a and 21b are also adjustable on the rod 22. The guide rods 38a and 38b are supported to the machine frame 14 by the plates 39a and 39b which are fixed to the square steel pipe 14c constituting the machine frame 14 and by the plates 40a and 40b which are fixed to the groove-shaped steel 14d of the machine frame 14. The moving member 19 described above is slidably fitted to the guide rods 38a and 38b through slide bearings 41a and 41b which are fitted to the journal boxes 19c and 19c', respectively. The fluid cylinder 42 is fitted to the bracket 43 which is fixed to the square steel pipe 14b of the machine frame 14, through the pin 44, and a connector 45 is fixed to the tip of a rod 42a of the fluid cylinder 42. This connector 45 is interconnected to an interconnection metal 46 fixed to the plate 26.

The reciprocating mechanism in the supply apparatus 200 of the tire constituent materials W is constituted as described above. When the rod 42a of the fluid cylinder 42 is moved forward, the moving member 19 moves forwardly while being guided by the guide rods 38a and 38b (or the guide mechanism) through the connector 45, the pin 47, the interconnection metal 46 and the plate 26 and at the same time, the material support plate 35 and the leaf springs 20a and 20b which are fitted to the moving member 19 also move forwardly.

At this time, the tire constituent materials W can be supplied onto the drum D by moving back the rod 28 of the fluid cylinder 27 to rotate and move downwardly the leaf springs 20a and 20b and moving forth the tire constituent materials W placed on the material support plate 35 under the pressed state.

When the rod 42a of the fluid cylinder 42 is moved back, on the contrary, the moving member 19 moves back while being guided by the guide rods 38a and 38b through the connector 45, the pin 47, the interconnection metal 46 and the plate 26, and at the same time, the material support plate 35 and the leaf springs 20a and 20b fitted to the moving member 19 also move back.

At this time, the material support plate 35 and the leaf springs 20a and 20b can be moved back without pulling the tire constituent materials W by moving forth the rod 28 of the fluid cylinder 27 to rotate and raise the leaf springs 20a and 20b while the tire constituent materials W are released from the pressed state. An L-shaped cutting guide plate 48 is fitted to the square steel pipe 14c of the machine frame 14 in an arrangement such that its tip 48a projects by a suitable distance l from the tip of the material support plate 35 when the material support plate 35 moves back. Accordingly, when the material support plate 35 moves back, the tire constituent materials W can be cut along the tip portion 48a of the cutting guide plate and when the material support plate 35 moves forth onto the drum D, the tip portions of the tire constituent materials W project by the distance l from the tip portion of the material support plate 35, and the material W can be manually pushed and press-bonded to the surface of the drum D.

Next, the operation of this invention will be described with reference to FIGS. 5(a) to 5(e).

In the first place, the tire constituent material W is pushed onto the material support plate 35 by the leaf spring 20 as shown in FIG. 5(a), and under this state, the machine frame 14 is moved toward the building drum D and the material support plate 35 as well as the leaf spring 20 are simultaneously moved forth in such a manner as to supply the tip Wa of the material W onto the drum D [FIG. 5(b)].

Next, the tip Wa of the material W thus supplied is manually pushed to the drum D and the push of the leaf spring 20 is then released so as to move back the leaf spring 20 and the material support plate 35. At the same time, the building drum D is rotated by a predetermined angle and the material W is wound on the building drum D [FIG. 5(c)]. Thereafter, the tire constituent material W is again pushed onto the material support plate 35 by the leaf spring 20, and is then cut manually by a knife or the like along the tip 48a of the cutting guide plate 48 [the guide member shown in FIG. 5(d)]. Thereafter, the building drum D is rotated to a position where the splicing work of both end portions Wa1 and Wa2 of the material can be made easily to carry out the bonding work. Thereafter, the machine frame 14 is moved back from the building drum D as shown in FIG. 5(e).

The operations described above are conducted in repetition and the tire constituent material W can be efficiently supplied to the building drum D.

Having the construction as described above, the present invention provides the following remarkable results:

(1) The tip of the tire constituent material can be supplied automatically while being located accurately to a predetermined position on the building drum. Therefore, it is necessary for the worker only to gently press-bond the tip portion of the material thus supplied onto the building drum, and everybody can easily, rapidly and accurately conduct the bonding work of the tip portion of the material to the building drum.

(2) Simultaneously, the cut position of the material after its winding onto the building drum can be determined automatically and accurately, and it is necessary for the worker only to cut the material along the guide plate. Therefore, everybody can cut easily, rapidly and accurately the material throughout its width in such a length as to obtain a suitable joint portion. Furthermore, it is not necessary to fold back the end portion of the remaining material after cutting to the servicer rack.

(3) As a result, the work speed and the assembly accuracy of the material are not dependent upon the skill of the workers and the work can be conducted rapidly and accurately. Therefore, the quality and producibility of the tire can be improved drastically, and the production management can be made easily without any variation resulting from worker to worker.

(4) Since the apparatus can be made compact in scale, the apparatus can be assembled in multiple stages without severe limitation to the space. Therefore, the apparatus can be applied to the conventional type servicers only by partly modifying them.

(5) Since there are not any automatic cutter and automatic press-splicing apparatus, the servicer apparatus is simple in construction and can be produced economically.

We claim:

1. A method of supplying a plurality of tire constituent materials individually and successively to a building drum, which comprises the steps of:
   providing a machine frame having a cutting guide member having an edge defining one end of said machine frame and disposed beneath a material support plate movable relative to said cutting guide members, said machine frame being movable toward and away from said building drum and including means for moving said material support plate relative to said cutting guide member,
   pressing a tip portion of one of said tire constituent materials on to one end of said material support plate by means of leaf springs;
   moving said machine frame from a first position to a position adjacent the building drum;
   simultaneously moving said material support plate and said leaf springs relative to said machine frame from a retracted position to an extended position where said tip portion of said tire constituent material, said material support plate and said leaf springs are extended beyond said cutting guide member of said machine frame toward the building drum;
   supplying said tip portion of said tire constituent material to said building drum by manually pressing the tip portion of said tire constituent material to adhere to said building drum;
   releasing said leaf springs;
   retracting said material support plate to said retracted position;
   rotating said building drum to a predetermined position to wind said tire constituent material about the circumference of said building drum;
   pressing said tire constituent material to said material support plate by said leaf springs;
   manually cutting said tire constituent material along said edge of said cutting guide member; and
   returning said machine frame with said material support plate and said leaf springs to said first position.

* * * * *